United States Patent Office 3,666,506
Patented May 30, 1972

3,666,506
BATCH FOR PRODUCING CELLULATED GLASSY BODIES FROM ROCK
James H. Cowan, Jr., and David Rostoker, Corning, N.Y., assignors to Corning Glass Works, Corning, N.Y.
No Drawing. Continuation-in-part of application Ser. No. 812,365, Apr. 1, 1969. This application Sept. 28, 1970, Ser. No. 76,226
Int. Cl. C04b 33/00
U.S. Cl. 106—41       8 Claims

ABSTRACT OF THE DISCLOSURE

This invention relates to cellulated glassy bodies, having a uniform closed cellular structure and a density on the order of .4 gram/cc., made by preparing a mixture of clay, sodium hydroxide, other fluxes, and an organic cellulating agent, and then firing the mixture, preferably at temperatures less than about 950° C. (1740° F.).

This application is a continuation-in-part application of Ser. No. 812,365, filed Apr. 1, 1969, and now abandoned.

BACKGROUND OF THE INVENTION

Foamed or cellulated refractory bodies; that is, inorganic heat resistant bodies expanded by the internal development of non-connecting gas filled cells while the material is in a coalesced or fused state, are well known. Foamed glass products, having densities on the order of 0.15 to 0.30 gram per cc., have been in use for several years to provide buoyancy, light weight, and thermal insulation in conjunction with resistance to heat and moisture penetration.

Such commercial products are customarily produced from premelted glass. In general, the process involves premelting a suitable glass composition, pulverizing the admixture with chemically reactable gas producing agents such as a carbon reducing agent in conjunction with an oxidizing agent, depositing a layer of the pulverized mixture in a closed pan, heating to a foaming temperature of about 800°–900° C. (1470°–1650° F.) and then annealing over a period of several hours. The products and processes of production are technically satisfactory, but high production costs have imposed a limit on areas of utility for these foamed glass products. Major economic factors are glass batch cost, mold equipment, and separate melting, grinding, and foaming operations.

It has long been recognized that direct foaming of either a natural raw material or waste slag material into large bodies should provide a distinct economic advantage. Accordingly, numerous methods of foaminng molten slag materials have been proposed. However, these have not been commercially adopted except in the production of light weight aggregate, normally small pellets, for concrete mixtures. There appears to be a basic difficulty in obtaining uniform and adequate cellulation of slag material as it is obtained in the molten state.

It has been proposed to directly foam either an unmelted glass batch or natural minerals since direct foaming would avoid the premelting step. In spite of the readily apparent economic advantage, these proposals have not been commercially adopted to make large bodies. It has proven difficult to uniformly cellulate an unmelted glass batch due to the occurrence of batch reactions and segregation during the foaming process. The use of natural minerals can obviate these problems but requires cellulating temperatures on the order of 200°–500° C. (350°–900° F.) higher. At such temperatures, the carbon reducing agents heretofore conventionally employed to foam premelted glass cannot provide adequate cellulation. The use of clays or shales as batch ingredients has been proposed but also normally require high cellulation temperatures.

Due to the requirement of a reducing atmosphere it is necessary in most cases to contain the batch in a mold during cellulation. The mold can be a metal mold for lower temperature glass systems but in the case of the higher cellulation temperatures of clays or shales the batch is fed into ceramic molds. The batch is then heated to the cellulation temperature and held thereat while the body expands. This type of operation presents several problems which arise from the fact that a ceramic mold is normally required. These problems include feeding the batch into a mold, removal of the cellulated body from the mold, cleaning the mold, the fairly large capital investment in the molds, their large mass and heat capacity, and their fragility. Thus, it has been shown to be highly desirable to produce cellulated glassy bodies without utilizing a restraining mold to hold the batch materials and at temperatures where thin firing platforms can be used.

SUMMARY OF THE INVENTION

We have invented a unique batch composition which may be cellulated at low temperatures, without restraint; and wherein the shape of the cellulated body maintains the configuration of the preformed batch material. The principal batch ingredients include (1) at least one rock selected from the group consisting of clays, volcanic ash, and the intermediate products of weathered volcanic ash; (2) an added flux; and (3) a cellulating agent. A rock, as used herein, is defined as a naturally occurring aggregate of minerals. Clays are preferred and the discussion hereinafter will refer specifically thereto although the other rocks, volcanic ash, and the intermediate products of weathered volcanic ash, can be functional equivalents of clay. The aforementioned batch ingredients are mixed and when heated to temperatures as low as about 800° C. will cellulate to form a light weight glassy body having a fine uniform cell structure. The batch may be pressed or otherwise shaped into a desired configuration and then fired on thin flat plates. During the cellulation, the body expands but maintains the same configuration as the preformed batch material.

The anhydrous batch contains at least about 50% by weight of rock, preferably clay, with additions of flux and cellulating agents. We have found that at least about 20% of the total flux must be added to the batch as sodium hydroxide (NaOH) and/or sodium silicate ($Na_2SiO_3$). Moreover, at least 60% by weight of the total flux should be $Na_2O$. The sodium hydroxide appears to react with the clay, to produce a chemical comminution thereof, so as to yield more uniform cellulation and sodium silicate or sodium aluminosilicate in situ. The alkali silicate, added or formed in situ, provides a more rapid fluxing action. The cellulating agent is an organic material which will thermally decompose and yield carbon as one of the decomposition products. One of the preferred cellulating agents is sodium acetate. The silica/alumina ($SiO_2/Al_2O_3$) ratio, as calculated from the batch on the oxide basis, must fall within the ratio of about 3:1 to 7:1, with the total flux being between about 10% and 20%. Furthermore, impurities such as CaO, MgO, BaO, and $Fe_2O_3$ should not exceed about 10% as calculated from the batch on the oxide basis. The aforementioned ratio is essential so as to provide a glassy matrix which will be within the proper viscosity range at the low firing temperature so as to entrap the cellulating gas.

The batch ingredients are finely ground and mixed so as to provide an intimate homogeneous admixture. The mixed batch is then pressed or otherwise shaped to the desired configuration. The shaped body is then fired on relatively thin supporting plates which allow the body to be heated and expand uniformly. The body and supporting plate are then subjected to a cellulation firing and annealing schedule. This cellulation firing comprises a rapid heating to a temperature at which cellulation will occur but at which the supporting plates will not distort or otherwise deteriorate. The body is held at the cellulation temperature for a length of time sufficient to achieve the minimum density attainable at that temperature without incurring bubble coalescence. Thereafter, the body is rapidly cooled to the annealing temperature and then slowly cooled to room temperature through an annealing schedule. The shape of the body will determine whether or not it is to be fired on supporting plates. For example, the batch may be formed into pellets and the pellets may be free foamed in place but not necessarily on supporting plates. The foamed glassy pellet may be used as light weight aggregate for additions to concrete or other materials wherein it is desirable to reduce the bulk density of the material. The batch may also be pressed into a green billet having a tile-like shape and then foamed, without restraint, to form a tile of the same configuration as the green billet.

DESCRIPTION OF THE PREFERRED EMBODIMENTS

Batch ingredients

The raw batch material comprises rock, preferably clay, additive alkali metal oxide fluxes including NaOH and/or $Na_2SiO_3$ and a cellulating agent. The combination of clay, additive alkali metal oxide fluxes, and the cellulating agents comprise at least 65% by weight of the anhydrous batch with up to 35% of the batch being added silica, alumina, and/or grog. Grog is waste fired material that has been finely ground. The main components of the batch are silica, alumina, and alkali metal oxide; these components are present in weight percent as calculated from the batch in about the following amounts: 50–80% $SiO_2$, 10–25% $Al_2O_3$, 10–20% $R_2O$, 0–10% impurities with the $SiO_2/Al_2O_3$ ratio being between about 3:1 and 7:1. If the silica exceeds the amount disclosed therein the batch is too viscous to allow proper foaming. If the batch is too high in alumina, the liquidus of the batch is too high to allow appropriate foaming; and, if the alkali metal oxide exceeds that disclosed, the batch is too fluid to allow proper foaming. Conversely, if the silica is below the minimum, the batch is not sufficiently viscous; if the alumina is below the minimum, the batch may be too fluid; and, if the alkali metal oxide is below the minimum, the batch may be too viscous for proper cellulation.

The batch ingredients are determined on two bases: the first is the oxide basis as calculated from the batch and the second is the anhydrous basis which represents the raw batch ingredients without added water. However, the clay may contain up to 15% adsorbed water in addition to any water of hydration. Adsorbed water is that water which can be removed from the clay by heating at a temperature between about 110° C. and 150° C. The water of hydration can be removed by heating at about 500°–700° C.

Clays and volcanic ash

One class of naturally occurring materials which contain two of the main components, silica and alumina, are clays. Clays are plastic, earthy, fine-grained materials, predominantly composed of clay minerals. Clay minerals are generally platy, hydrous aluminum silicates that can have appreciable quantities of iron, alkalies, and alkaline earths. We have found that clays containing substantial quantities of illite and/or smectite minerals are particularly desirable for foaming. However, we prefer to use clays containing the following members of the smectite group: montmorillonite, beidellite, and nontronite. In particular, clays containing montmorillonite are preferred. The minerals of the smectite group are preferred since they have a high silica to alumina ratio and can absorb into their structure certain organics which can act as cellulating agents. The theoretical formula for smectite minerals is $(OH)_4 Si_8Al_4O_{20} \cdot H_2O$ while the theoretical composition, in weight percent, is 66.7% $SiO_2$, 28.3% $Al_2O_3$, and 5% $H_2O$. Various lattice substitutions occur which characterize the different members of the smectite group. In montmorillonite, magnesium and sodium partially replace aluminum; in beidellite, aluminum and sodium partially replace silicon; and in nontronite, aluminum and sodium partially replace silicon while iron replaces aluminum.

In addition to the clay minerals the clays also contain other minerals. We have determined that the silica to alumina ratio of the batch should be between about 3:1 and 7:1. Thus, it is desirable to use clays containing clay minerals that have as high a silica to alumina ratio as possible. For example, in a bentonite clay, having as its predominant clay mineral montmorillonite, we have found a silica to alumina ratio of about 5:1. However, the montmorillonite has a ratio of about 4:1. Thus, the remaining silica is obtained from other non-clay minerals such as cristobalite. Listed below in Table I are several clays which can be used, their major clay minerals, the silica to alumina ratio, and the clay composition.

TABLE I

| Clay | Principal clay mineral | $SiO_2/Al_2O_3$ | $SiO_2$ | $Al_2O_3$ | $Fe_2O_3$ | CaO | MgO | $Na_2O$ | $K_2O$ | Balance |
|---|---|---|---|---|---|---|---|---|---|---|
| Wyoming bentonite | Montmorillonite | 2.8 | 66.0 | 23.5 | .7 | 2.4 | 3.9 | 1.4 | .1 | 2.0 |
| Horseheads, N.Y. clay | Illite | 3.5 | 66.0 | 19.2 | 7.5 | .5 | 2.0 | .6 | 1.5 | 2.7 |
| Gonzales bentonite | Montmorillonite | 4.8 | 77.0 | 16.0 | 1.4 | 1.3 | 3.0 | .8 | .5 | |
| Japanese bentonite | do | 5.6 | 79.0 | 14.0 | 1.9 | 1.7 | 2.6 | .6 | | |

To those batches wherein the clay does not provide the desired silica to alumina ratio finely ground silica and/or alumina may be added in sufficient amounts to achieve the desired ratio.

It is known that in foaming reactions the finer the particle size, or grain size, of the reactants the more uniform is the resulting foam structure. From this point of view, bentonite clays containing substantial amounts of montmorillonite are highly desirable, since the grain size of the clay is normally less than about 5 microns. If other clays are selected which have the proper grain size but not the proper silica to alumina ratio, the additive silica and/or alumina should have a sufficiently small particle size to allow proper mixing. We have discovered that the best foam structures can be made where the particle size of all the reactants is less than about 5 microns. Nevertheless, we have found that satisfactory products can be made where essentially all particles will pass a standard United States 200 mesh screen and at least 10% of the particles are finer than 5 microns.

In our preferred embodiment, we have found that bentonite clays having montmorillonite as the principal clay mineral are the most desirable since they normally have the proper silica to alumina ratio, and are extremely fine grained. Bentonite clays are readily available throughout the world with a principal deposit in the Wyoming-South Dakota area of the United States. Moreover, in a particular embodiment, we prefer that the clay, preferably bentonite, comprise between about 70% and 87% of the anhydrous batch.

Bentonite clays are the result of the weathering of volcanic ash. A most important distinction between volcanic ash and bentonite is the grain size. The grain size of volcanic ash can be in excess of 5 microns. However, from a compositional point of view, bentonite clay and its precursors are essentially the same. Therefore, volcanic ash and the weathered intermediates between volcanic ash and bentonite are functional equivalents of bentonite clays provided that at least 10% of the particles thereof are less than about 5 microns in diameter.

Flux

In order to achieve the proper viscosity for foaming, it is necessary to add a flux to the clay. In other foaming systems, MgO, CaO, $Fe_2O_3$, and the like are considered as fluxing agents; but at the low temperatures used in this process, only the alkali metal oxides ($R_2O$) are effective fluxes. More specifically, we have found that soda ($Na_2O$) containing compounds are the best fluxes for clays, in the 800°–950° C. temperature range. We have found that the total amount of flux should be between about 10% and 20% by weight on the oxide basis as calculated from the batch. In these systems, at least 60% of the total flux should be $Na_2O$, with $Li_2O$ and $K_2O$ normally making up the remaining flux. Moreover, at least 20% of the total flux must be $Na_2O$ which has been added as NaOH and/or $Na_2SiO_3$.

We have found that the sodium hydroxide reacts with the clay so as to reduce the grain size still further thereby assuring even better cellulation and more uniform reaction. It is believed that the sodium hydroxide reacts with the clay mineral, particularly montmorillonite, to form an amorphous sodium-aluminosilicate. The fusion caused by the alkali silicate reduces the minimum cellulating temperature for the entire batch. In addition, the reaction between the sodium hydroxide and clay at room temperature produces a cementitious reaction product; that is, at least partially sodium silicate, which tends to strengthen the green body. Rather than using the sodium hydroxide which will form sodium silicate, a sodium silicate solution may be introduced into the batch. When only 20% of the $Na_2O$ is added as NaOH and/or $Na_2SiO_3$, the balance of the added flux may be in the form of another sodium salt, such as sodium carbonate. We have found that either NaOH or $Na_2SiO_3$ is necessary in order to produce an acceptable foam. Other alkali containing compounds may be substituted for the sodium salt but not for NaOH or $Na_2SiO_3$. However, if, for example, lithium and/or potassium salts are used the total of the oxide thereof should not exceed about 40% of the total flux. Typically, the added fluxes may be compounded as follows: at least 25% of the total flux being $Na_2O$ added as NaOH and/or $Na_2SiO_3$ with the remaining added flux being added as $Na_2CO_3$ and up to 20% flux being added as $Li_2CO_3$, $K_2CO_3$, LiOH, or KOH.

We prefer to use batches wherein the added flux containing materials are equal parts by weight NaOH and $Na_2CO_3$. In a particular embodiment we prefer that the total NaOH and $Na_2CO_3$ comprise between 12% and 18% of the anhydrous batch.

Cellulating agent

We have found that since the temperatures at which the batch fuses to the proper viscosity are relatively low, organic cellulating agents can be used rather than the inorganic cellulating agents of the prior art. Other cellulating gases may be available from the clay. As the batch is heated, the clay loses its absorbed water and then its water of hydration; if the batch has fused so as to form a viscous glass before dehydration is complete, the water of hydration may form steam and contribute to the expansion of the glass. Thus, there can be two cellulating agents. One is the water of hydration available in the clay, and the second is the gases produced due to the organic cellulating agent. We have found that the preferred organic cellulating agents are those compounds which will thermally decompose at a temperature below the desired cellulating temperature, leaving as one of the decomposition products carbon which may react to form CO or $CO_2$. The CO or $CO_2$ will then act as a cellulating gas. Carbon in the form of carbon black or graphite may be used. However, we prefer to use an organic compound or metal salt of an organic compound having carbon as a decomposition product. The weight of organic required is related to the amount of free carbon produced in the decomposition. For example, carbohydrates and compounds containing like amounts of oxygen can form CO and $H_2$ on heating but little, if any, carbon is formed. Thus, sodium oxalate will not work as a foaming agent since no carbon is produced. (See Equation 1.)

(1) 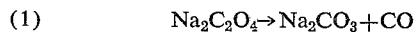

However, sodium acetate works quite well. (See Equation 2.)

(2) 

Thus, it is seen that one-half the carbon in sodium acetate is theoretically available for cellulation. In order to achieve the desired densities, the carbon available for cellulation should be between about .1 and 2.0% by weight of the anhydrous batch. Therefore, in using an organic foaming agent, the amount required is calculated from the amount of carbon formed during the thermal decomposition. For example, to have .15% free carbon in a batch would require the addition of about 1.0% sodium acetate. We have found that sodium acetate can be particularly effective in amounts between about .75% and 1.25% of the anhydrous batch. Table II below lists several operative and inoperative organic compounds.

TABLE II

Inoperative
(1) Lignosulfonates
(2) Sugar
(3) Starch
(4) Guanidine hydrochloride
(5) Hydrocarbons that vaporize or sublime
(6) Sodium oxalate
(7) Sodium tartrate Operative
(1) Sodium lauryl sulfate
(2) Sodium oleate
(3) Sodium stearate
(4) Sodium succinate
(5) Sodium salicylate
(6) Sodium propionate
(7) Calcium acetate
(8) Ferrous acetate If there is an excess of the cellulating agent present, it is difficult to control the reaction, while if there is an insufficient amount present the desired density cannot be obtained. In general, it seems that the cellulating agent is effective in producing a minimum density under a given set of conditions, but only up to a maximum concentration of that cellulating agent; above the maximum concentration thereof, there appears to be no benefit in further increase in the concentration of the foaming agent.

Grog

A batch consisting of 100% of the aforementioned raw batch ingredients may be used and foamed to provide the desired product. However, it may be desirable to add to the batch a small amount of grog. Grog is fired batch material which has been reground to a granular form. The addition of this grog aids in producing a crack free body. The amount of grog which may be introduced is related to the density which is desired. For a given set of conditions, larger additions of grog will generally increase the resultant density. In our process, wherein it is desired to produce products of density on the order of 0.4 gram/ cc., additions of more than 35% by weight grog are undesirable.

Batch preparation and forming

The clay, flux, and cellulating agent are mixed and ground together in a ballmill so as to obtain a fine intimately mixed particulate batch. The materials are ground for whatever length of time is necessary to assure proper sizing and mixing. We have found that ballmilling is the best technique for obtaining the desired intimate, homogeneous and uniform batch. Normally, the finer the particle size the better; however, there are apparatus limitations which limit the minimum particle size which can be obtained. Most often the batch will be pressed, in a standard ceramic press, so as to form a tile or other similar body. If simple rectangular shapes are desired, the powder, as milled, can be pressed. However, in order to form a complicated shape by pressing, it is necessary to form the batch into granules. The mixed batch is first compacted by passing it through rollers and thereafter granulated so as to provide a more workable batch material. The size of the granules should be such that they will pass through a 14 mesh United States Standard Sieve screen but not through a 100 mesh screen. The granulated batch may then be moistened by a fine water spray. The weight of the added water can be up to 7% of the weight of the anhydrous batch; in other words, the weight of the anhydrous batch plus the added water can be up to 107% of the anhydrous batch. The water is added primarily to provide green strength for the body when it is formed. The granulated batch is then formed into the desired configuration. Moreover, with the further addition of still more water, up to a total of 15% by weight, the batch may be extruded, pelletized, or shaped to configurations other than those available through pressing.

Firing schedule

Since the batch is preformed to the desired configuration and expands in order to accommodate the expansion of the gas in the body, the body is fired without restraint. Normally, the large tile-like bodies are supported during firing on a heat resistant perforate metal sheet, which has been coated with a material which allows the body to expand without its sticking to the metal sheet. We have also found that thin glass-ceramic sheets of low thermal expansion, .060–0.300 inch thick, may be used. The sheet is normally very thin so that the heat transfer characteristics thereof are quite uniform. As the body is fired and the cellular structure forms, the body expands and is able to expand in all directions since it will not stick or adhere to the sheet. The preferred firing schedule is a heating to the cellulating temperature and a hold thereat for a length of time sufficient to achieve the minimum density. After cellulation, the body is then cooled through an annealing schedule so as to avoid cracking and the buildup of internal stresses in the body. From a general point of view, we have found that the idealized schedule is applicable for most pressed bodies and pellets. With all other factors remaining constant, we have found that in order to achieve the desired densities, a foaming temperature between about 800°–950° C. (1560°–1740° F.) is necessary. The minimum temperature is related to the formation of the glass and entrapment of the gas. The maximum temperature is related to the distortion of the support plates. The length of time at firing temperatures between 800°–950° C. can vary between 2 minutes and 2 hours depending upon section size and firing temperature. However, if it were not essential to use thin support plates and the uniformity of the cellular structure were not critical, then temperatures in excess of 950° C. (1740° F.) could be used for foaming. For example, pellets could be expanded on ceramic or heavy metal substrates at temperatures in excess of 950° C. (1740° F.). A typical firing schedule for a pressed body having a maximum cross sectional thickness of about ¾" would be to heat the body to 900° C. at a rate faster than about 200° C./hour; hold at 900° C. for about 10 minutes; and then cool to about room temperature in approximately 40 minutes. The fired body has a same configuration as the preformed unfired body, and has undergone a linear expansion of about 45%. Other schedules can be developed for bodies of various sizes and configurations.

Properties of the fired foamed product

The unique features of the fired product are that it is strong, light weight, inexpensive to produce, has an extremely uniform cell size and distribution thereof, has a closed cell structure and maintains the configuration of the pressed body. Normally, the cells are of a generally spherical shape with few, if any, cells being larger than about ¼" diameter. This is highly advantageous since if the sphere size is increased or the sphericity decreases, thin spots in the walls can be created which weaken the body as well as reducing the desired impermeability. Due to an almost total loss of foaming agent at the surface of the body, the surface thereof is somewhat denser than the interior portion. The density of the resultant product is normally less than about .5 gram/cc., when the body is fired at temperatures less than 950° C. However, with changes in the firing schedule and changes in the batch composition, densities as low as .15 gram/cc. or as high as .65 gram/cc. can also be produced. The bulk thermal coefficient of expansion of the resultant bodies is on the order of $65-95 \times 10^{-7}/°$ C. (25°–300° C.). Since the body is a foamed glassy body with residual undissolved compounds, a reproducible exact expansion is difficult to obtain and thus the coefficients of expansion are averages thereof. The glassy portion of the cellulated body is basically an alkali aluminosilicate having minor amounts of the alkaline earth metal oxides therein. The range of glass compositions is set forth in weight percent on the oxide basis as calculated from the batch below:

(1) total $SiO_2$ between about 50–80%,
(2) total $Al_2O_3$ between about 10–25%,
(3) total $R_2O$ between about 10–20% with $Na_2O$ comprising at least 60% of the total,
(4) total impurities between about 0–10%,
(5) $SiO_2$ and $Al_2O_3$ in the ratio of between about 3:1 and 7:1.

The modulus of rupture (MOR) for bodies having a density of about .65 gram/cc. is on the order of 550 p.s.i.; while when the density is about .15 gram/cc. the MOR is about 150 p.s.i. The gas content of the cells was analyzed and determined to be primarily $CO_2$, $CO$, $N_2$, and $H_2O$. The glassy portion of the cellulated body is a partially melted glass containing minor amounts of non-glassy phases including alpha quartz, cristobalite, and plagioclase feldspar.

Batches which are prepared within the limits set forth above, by the selection of various combinations of the clays, fluxes, and cellulating agents as set forth herein, can be treated according to the methods and firing schedules set forth so as to produce acceptable cellulated bodies. Therefore, the following examples are set forth as illustrative of the product and process and not as specific limitations thereon.

EXAMPLE 1

A batch to be foamed was prepared from the following batch ingredients:

(1) 83 pounds of an air floated Gonzales bentonite clay, having as its principal clay mineral montmorillonite, and an approximate oxide composition in weight percent as follows: 77% $SiO_2$, 16.0% $Al_2O_3$, 0.8% $Na_2O$, 0.5% $K_2O$, 1.3% $CaO$, 3.0% $MgO$, and 1.4% $Fe_2O_3$. This clay also contained about 10% adsorbed water and 6% water of hydration;
(2) 8 pounds anhydrous granular sodium hydroxide;
(3) 8 pounds anhydrous granular sodium carbonate; and
(4) 1 pound anhydrous powdered sodium acetate.

The above ingredients were mixed and then ballimilled for two hours to insure adequate mixing. The mixed batch was then blended with 25 pounds of −14 mesh grog and 6 pounds of water was added, by spraying to cause some granulation.

The granulated batch was fed into a mold and pressed at 5,000 p.s.i. to form a green body ½" x ½" x 4". The bar was then placed in a furnace at 900° C. for 15 minutes to foam. The cellulated bar was removed, placed in another furnace and slow cooled to room temperature. The foamed body was of the same configuration as the green body and had dimensions of 11/16" x ¾" x 5⅝". This body had a uniform cellular structure and a density of .30 gram/cc.

Several bodies were prepared as in Example 1, but without grog, and fired at the temperatures shown. The bodies all foamed and yielded the densities shown below.

| Example | Firing temperature, °C. | Density, gram/cc. |
|---|---|---|
| 2 | 800 | .60 |
| 3 | 850 | .40 |
| 4 | 875 | .30 |
| 5 | 900 | .26 |
| 6 | 925 | .25 |
| 7 | 950 | .22 |

EXAMPLE 8

A batch was prepared wherein the flux addition was completely sodium hydroxide, so that the total sodium hydroxide addition to the batch of Example 1 was 14 pounds. The batch was treated and the body was fired as in Example 1. The resultant product was a uniformly cellulated body having a density of .30 gram/cc.

Other bodies having the batch composition of Example 8, but without grog, were fired at the temperatures of Examples 2–7 inclusive. The resultant densities were essentially identical.

EXAMPLE 9

A batch was prepared in a manner similar to that of Example 1 except the batch ingredients were as follows:

| | Pounds |
|---|---|
| Gonzales bentonite | 70.7 |
| Sodium carbonate | 8 |
| Sodium acetate | 1 |

Those ingredients were ballmilled for two hours and then 39.6 pounds of a 15% $Na_2O$-30% $SiO_2$ sodium silicate solution was uniformly dispersed in the milled batch. The batch was then pressed and fired as in Example 1. The resultant body was a uniformly cellulated body having a density of .30 gram/cc.

Other bodies having the batch composition of Example 9, but without grog, were fired at the temperatures of Examples 2–7 inclusive. The resultant densities were essentially identical.

EXAMPLE 10

A batch was prepared as in Example 1 except that the amount of sodium carbonate was reduced to 4.25 pounds. This reduced the total flux from 12.8% to 10.4%. This reduction in flux increased the $Al_2O_3$ to 17%. This new batch was prepared, pressed and fired at 900° C. as in Example 1, but without grog. The resultant body was uniformly cellulated and had a density of .45 gram/cc.

Three additional bodies were prepared as in Example 10 and were fired at the temperatures shown below with the resultant densities as shown:

| Example | Firing temperature, °C. | Density, gram/cc. |
|---|---|---|
| 11 | 875 | .65 |
| 12 | 925 | .35 |
| 13 | 950 | .30 |

EXAMPLE 14

A batch was prepared as in Example 1 except the total flux was increased by increasing the amount of sodium carbonate to 12.6 pounds and the sodium hydroxide to 9.15 pounds. This increased the total alkali metal oxide flux to 19% and reduced the $Al_2O_3$ to 13%. The batch was then mixed, pressed and fired at 900° C. This firing produced a body having a density of .25 gram/cc.

Three additional bodies were prepared as in Example 14, fired at the temperatures shown below and produced the densities shown below:

| Example | Firing temperature, °C | Density, gram/cc. |
|---|---|---|
| 15 | 800 | .45 |
| 16 | 850 | .35 |
| 17 | 870 | .30 |

EXAMPLES 18

A batch was prepared as in Example 1 without grog and with the acetate being increased to 2%. The batch was then pressed and fired at 900° C. The resultant body had a density of .23 gram/cc.

Several other bodies having the same composition as Example 18 were fired at different temperatures as shown below:

| Example | Firing temperatuae, °C. | Density, gram/cc. |
|---|---|---|
| 19 | 875 | .23 |
| 20 | 925 | .25 |

Several samples were prepared as in Example 1 except that carbon black (as available from the Cabot Corp.) was substituted, for sodium acetate, as the foaming agent. The following table shows the effect on density of increasing amounts of carbon black.

| Example | Percent carbon black | Density, grams/cc. |
|---|---|---|
| 21 | 0.1 | .45 |
| 22 | 0.2 | .30 |
| 23 | 0.3 | .25 |
| 24 | 0.4 | .23 |
| 25 | 0.6 | .22 |
| 26 | 1.0 | .22 |

In the following group of examples, other organics were substituted for the sodium acetate of Example 1, otherwise all conditions were the same.

| Example | Compound | Pounds | Density, gram/cc. |
|---|---|---|---|
| 27 | Sodium oleate | 0.4 | 0.34 |
| 28 | Sodium succinate | 2.0 | 0.30 |
| 29 | Malonic acid | 0.8 | 0.35 |

EXAMPLE 30

A volcanic ash of approximately the following composition: 73% $SiO_2$, 14.3% $Al_2O_3$, 3% $Na_2O$, 4% $K_2O$, 1% $Fe_2O_3$, 1% MgO, 0.5% CaO, having a moisture content of 0.5%, a loss on ignition of 3% and a grain size of about 3 microns was milled for 4 hours with anhydrous NaOH and anhydrous sodium acetate. The milled batch consisted of 87 pounds volcanic ash, 11.8 pounds NaOH, and 1.2 pounds sodium acetate. This mixture was pressed into a bar and fired for 15 minutes at 900° C. The resultant body was cellulated and had a density of 0.30 gram/cc.

EXAMPLE 31

A foamed product consisting of a combination of volcanic ash and clay was prepared from the following batch ingredients:

(1) 75 pounds of the volcanic ash described in Example 30;
(2) 15 pounds air floated Gonzales bentonite clay;
(3) 4.5 pounds anhydrous granular sodium hydroxide;
(4) 4.5 pounds anhydrous granular sodium carbonate; and
(5) 1 pound anhydrous powdered sodium acetate.

The above ingredients were ballmilled together for four hours to insure complete mixing. A particle size analysis of the resultant batch demonstrated:

| Percent: | Microns |
|---|---|
| 100 | <74 |
| 95 | <30 |
| 40 | <10 |
| 20 | <5 |

The mixed batch was thereafter blended with six pounds of water, fed into a mold, and pressed at 5000 p.s.i. into ½" x 2" discs. The discs were placed in an electrically-fired furnace, heated at 400° C./hour to 880° C., maintained thereat for 15 minutes, and then slow-cooled to room temperature. The fired discs exhibited a uniform cellular structure and a density of about 0.35 gram/cc.

We claim:

1. A batch consisting of particles essentially all passing a standard United States 200 mesh screen and at least 10% thereof being finer than 5 microns useful for making a cellulated glass body consisting essentially, on an anhydrous basis, of rock, a cellulating agent, and a flux wherein:
   (a) said rock comprises at least 50% by weight of the total batch and is selected from the group consisting of volcanic ash, weathered volcanic ash, clay, and mixtures thereof;
   (b) said cellulating agent comprises about 0.1–2% carbon and is selected from the group consisting of carbon, an organic compound which thermally decomposes below the cellulating temperature to yield carbon, and mixtures thereof; and
   (c) said flux comprises alkali metal oxides wherein at least about 20% by weight thereof is added as NaOH and/or $Na_2SiO_3$ and at least about 60% by weight of the total thereof is $Na_2O$;
   said batch consisting essentially, calculated by weight on the oxide basis (exclusive of said cellulating agent), of about 10–20% alkali metal oxide, about 70–90% $SiO_2+Al_2O_3$, wherein the ratio $SiO_2/Al_2O_3$ ranges between about 3:1 to 7:1, and the total of the alkali metal oxide, $SiO_2$, and $Al_2O_3$ constitutes at least 90% by weight of said batch.

2. A batch according to claim 1 wherein said clay contains, as a principal component, at least one mineral from the illite and/or smectite groups.

3. A batch according to claim 2 wherein said mineral is montmorillonite from the smectite group.

4. A batch according to claim 3 wherein bentonite clay provides said montmorillonite mineral.

5. A batch according to claim 1 wherein up to 40% by weight of the total flux consists of $Li_2O$ and/or $K_2O$.

6. A batch according to claim 1 wherein up to 35% by weight of the anhydrous batch consists of grog.

7. A batch according to claim 1 wherein said organic compound which thermally decomposes below the cellulating temperature to yield carbon is selected from the group consisting of sodium acetate, sodium lauryl sulfate, sodium oleate, sodium stearate, sodium succinate, sodium salicylate, sodium propionate, calcium acetate, and ferrous acetate.

8. An integral glassy body produced by cellulating the batch of claim 1 and exhibiting:
   (a) a density between about 0.15–0.65 grams/cc.;
   (b) a modulus of rupture between about 150–550 p.s.i.;
   (c) an essentially uniform, closed cell structure where the cells are generally spherical in shape and do not exceed about ¼" in diameter; and
   (d) a coefficient of thermal expansion between about $65-95 \times 10^{-7}/°$ C.

References Cited

UNITED STATES PATENTS

| | | | |
|---|---|---|---|
| 2,706,844 | 4/1955 | Nicholson | 106—40 R |
| 3,203,813 | 8/1965 | Gajardo et al. | 106—40 R |
| 2,553,759 | 5/1951 | Geiger | 106—40 R |
| 2,171,290 | 8/1939 | Hobart | 106—40 R |
| 3,232,772 | 1/1966 | Hilton et al. | 106—40 R |
| 3,150,989 | 9/1964 | Parsons | 106—40 R |
| 3,505,089 | 4/1970 | Rostoker | 106—40 R |

TOBIAS E. LEVOW, Primary Examiner

W. R. SATTERFIELD, Assistant Examiner

U.S. Cl. X.R.

65—22; 106—40; 264—43